United States Patent
Guerrero, Sr.

(10) Patent No.: US 11,385,375 B2
(45) Date of Patent: Jul. 12, 2022

(54) STUD FINDER

(71) Applicant: Juan L. Guerrero, Sr., McAllen, TX (US)

(72) Inventor: Juan L. Guerrero, Sr., McAllen, TX (US)

(*) Notice: Subject to any disclaimer, the term of this patent is extended or adjusted under 35 U.S.C. 154(b) by 520 days.

(21) Appl. No.: 16/555,788

(22) Filed: Aug. 29, 2019

(65) Prior Publication Data
US 2020/0073006 A1 Mar. 5, 2020

Related U.S. Application Data

(60) Provisional application No. 62/724,310, filed on Aug. 29, 2018.

(51) Int. Cl.
*G01V 3/08* (2006.01)
*G01V 3/15* (2006.01)

(52) U.S. Cl.
CPC .............. *G01V 3/08* (2013.01); *G01V 3/15* (2013.01); *Y10S 33/10* (2013.01); *Y10S 248/906* (2013.01); *Y10S 269/904* (2013.01)

(58) Field of Classification Search
CPC . G01V 3/08; G01V 3/15; G01V 3/165; Y10S 269/904; Y10S 248/906; H02G 1/00; H02G 3/12; H02G 3/14
See application file for complete search history.

(56) References Cited

U.S. PATENT DOCUMENTS

| | | |
|---|---|---|
| 2,933,679 A | 4/1960 | Bray |
| 4,896,131 A | 1/1990 | Podlesny |
| 5,148,108 A | 9/1992 | Dufour |
| D339,074 S | 9/1993 | Dufour |
| 6,229,294 B1 | 5/2001 | Wun |
| 6,978,503 B2 | 12/2005 | Cogliano |
| 7,690,124 B1 | 4/2010 | Henry |
| 9,069,028 B2 | 6/2015 | Ebner et al. |
| 9,134,447 B1 | 9/2015 | Tin et al. |
| 2011/0267050 A1* | 11/2011 | Flores ............... G01R 33/02 324/259 |
| 2015/0091553 A1* | 4/2015 | Wong ................ G01V 3/15 324/207.11 |
| 2018/0252832 A1* | 9/2018 | Smoot ............... G01R 27/00 |

OTHER PUBLICATIONS

Master Magnetics 07612 Magnetic Stud Finder with Shield Drywall Screw and Nail Locator, Red, available at https://www.amazon.com/Master-Magnetics-07612-Magnetic-Drywall/dp/B003VKEW7S/refsr_1_1?keywords= (last visited Sep. 18, 2019).

* cited by examiner

*Primary Examiner* — Raul J Rios Russo
(74) *Attorney, Agent, or Firm* — McKinnie & Paul, PLLC

(57) ABSTRACT

A stud finder for detecting ferrous objects hidden within a wall, such as nails and screws, comprising a tray having at least one cavity, a magnet, and a cover. The magnet placed within the cavity and secured by the cover. The magnet is free to move within the cavity when a force, such as gravity or magnetic, is applied. As the stud finder is slid across a wall, a magnet will move within the cavity when it comes into proximity of a ferrous material such as a screw or nail. The movement is caused by magnetic force. The presence of the magnetic force indicates the presence of a screw or nail which also indicates the presence of a stud.

12 Claims, 6 Drawing Sheets

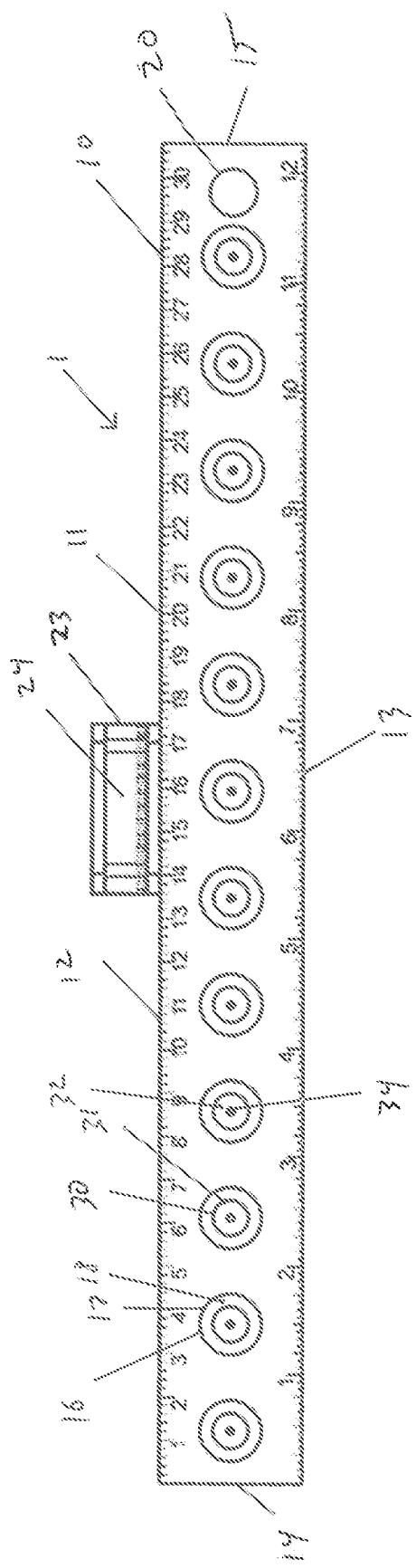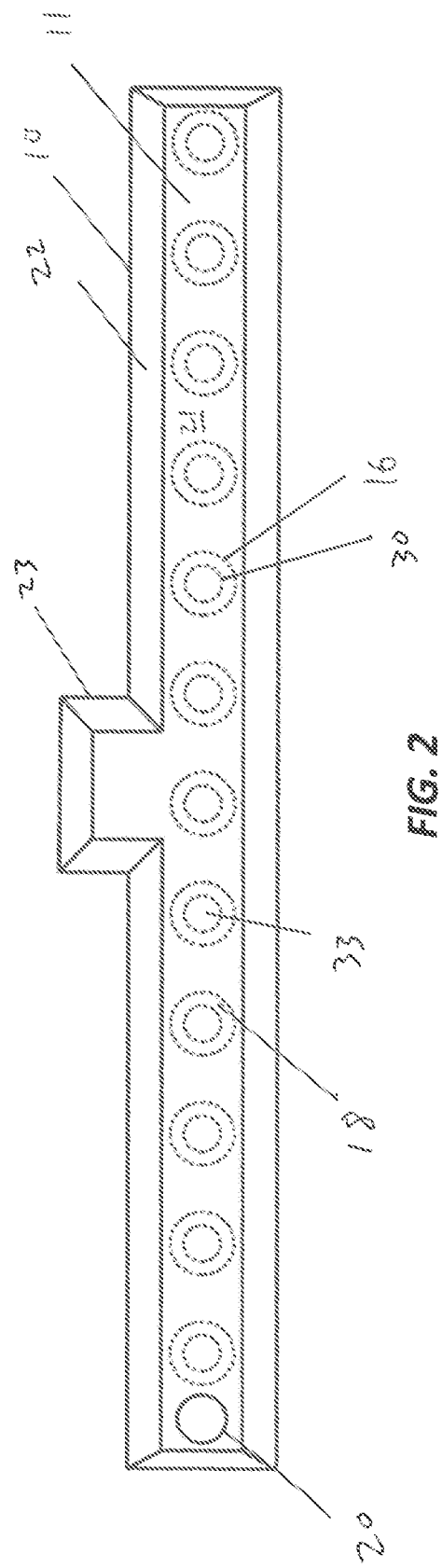

STUD FINDER

CROSS-REFERENCES TO RELATED APPLICATIONS

This application claims the benefit of U.S. Provisional Application Ser. No. 62/724,310 filed Aug. 29, 2018 entitled Stud Finder which is incorporated by reference herein.

STATEMENT REGARDING FEDERALLY SPONSORED RESEARCH OR DEVELOPMENT

Not applicable.

BACKGROUND OF THE INVENTION

1. Field of the Invention

The present invention relates to detection of studs within a wall.

2. Background of the Related Art

A typical wall is constructed with sheetrock or paneling screwed or nailed into a wooden or metal stud. The screws and nails are then concealed through mud, caulk, or other filler. Paint and texture is then applied further concealing the location of the screws and nails.

In certain situations it is advantageous to know where studs are located within wall. It may be advantageous to know the location of the studs if one is looking to create a hole through a wall such as placement of a vent or other opening. In other situations it is advantageous to know where a stud is based so one can insert a screw into a stud to use its strength. Various low tech solutions were previously used including magnets and various tricks to detect sound changes. Various advanced technologies exist to find studs such as capacitance (density) readings and micropower impulse radar. The newer technologies are expensive and or generate false positives. For example, density readings may detect pipes, wiring conduits, or cross braces that are positioned away from the wall. Furthermore, wall board and other materials other than sheetrock may make it difficult for commercially available detectors to accurately detect studs. A low cost method to detect studs remains necessary for home remodeler professionals and do-it-yourselfers.

SUMMARY OF THE INVENTION

The present invention utilizes at least one magnet to detect a ferrous material hidden in a wall. The magnet, secured within a cavity, moves when the stud finder approaches a screw or nail that is hidden within the wall. As the stud finder comes closer to the nail or screw, the magnet moves against the force of gravity upwards within the cavity signaling the location of a screw or nail. A place marker, also having a magnet, is placed in the location in which the screw or nail is found. The magnetic force keeps the place holder against the wall at the location of the screw or nail. The location of a stud behind the wall may be deduced from the location of the screws and/or nails as the screws and/or nails are used to secure the wall covering, such as sheetrock, to studs.

BRIEF SUMMARY OF THE DRAWINGS

FIG. 1 is a front view of an embodiment of the present invention.

FIG. 2 is a back view of an embodiment of the present invention.

DETAILED DESCRIPTION OF THE INVENTION

Figure 3:
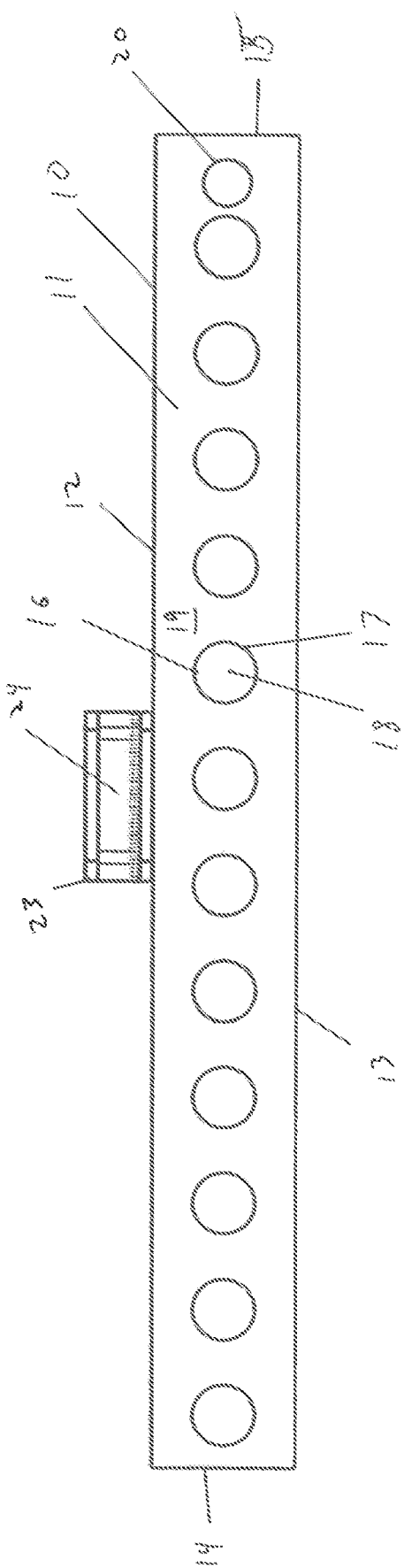
FIG. 3 is a front view of the tray.

As seen in FIGS. 1-5, the stud finder 1 comprises a tray 10, magnets 30, and cover 40. The tray 10 comprises a rectangular shaped base 11 having four generally perpendicular upwardly projecting continuous sidewalls comprising a top sidewall 12, a bottom sidewall 13, a left sidewall 14, and a right sidewall 15. As seen more clearly in FIG. 3, the base 11 has a plurality of cavities 16. Each cavity 16 is formed by a cylindrical sidewall 17 having a uniform height extending perpendicularly from a bottom 18. The opening to the cavity 16 is on the front surface 19 of the base 11. The diameter of the bottom 18 is generally equal to the opening to the cavity 16. The cavity 16 is located approximately in the middle between the top sidewall 12 and bottom sidewall 13. In the preferred embodiment, there are twelve cavities uniformly spaced between the left sidewall 14 and right sidewall 15. A hole 20 is formed through the base 11 and positioned between the last cavity 16 and the right sidewall 15. The back surface 21 of the base 11, opposite to the front surface 19, includes beveled edges 22 along the perimeter. The back surface 21 is generally smooth. The bottom 18 is generally parallel with the back surface 21 and front surface 19. A level mount 23 extends from the top sidewall 12. A level 24 is attached to the level mount 23 in such a manner in that the level 24 is parallel to the top sidewall 12 and bottom sidewall 13.

Figure 5:
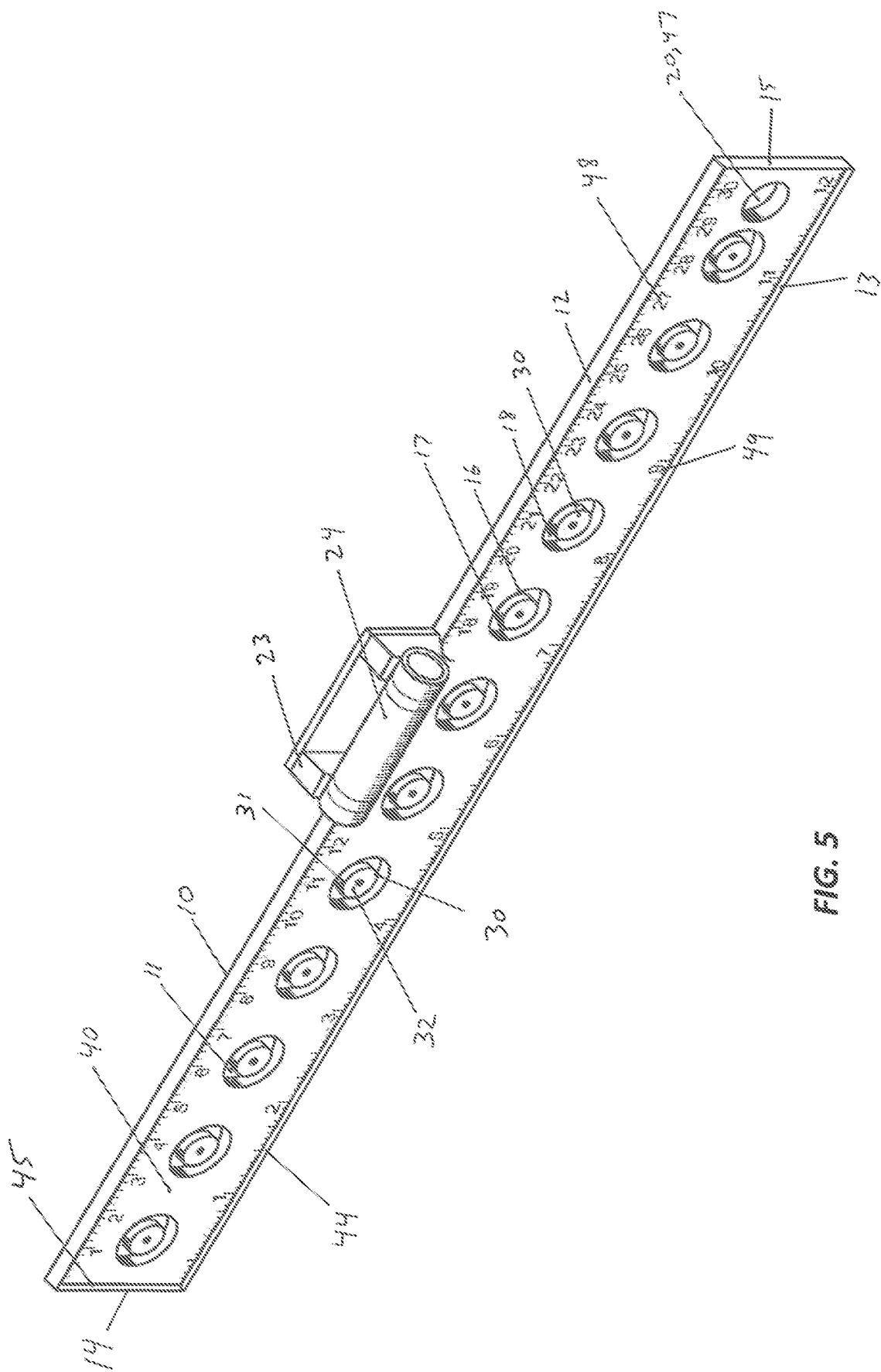
FIG. 5 is a perspective view of an embodiment of the present invention.

As seen in FIGS. 1-2 and 5, the stud finder 1 further includes a magnet 30 having a cylindrical sidewall 31, a top surface 32, a bottom surface 33, and a marker 34 on the top surface 32. The height of the cylindrical sidewall 31 of the magnet 30 is less than the height of the circular sidewall 17 of the cavity 16 but is at least half the height of the circular sidewall 17 of the cavity 16. The diameter of the magnet 30 is less than the diameter of the cavity 16. In the present embodiment the marker 34 is a dot but other markings may be used to provide greater contrast and visibility and to identify the polarity of the magnet 30. In the preferred embodiment, each magnet 30 is placed within the cavity with the same polarity direction. This causes the magnets 30 to repel each other and keep each magnet 30 generally in the center of the cavity 16. Furthermore this prevents each individual magnet from interfering with the other magnets. As a result, when a magnet is drawn to a ferrous material in the wall, the magnetic attraction is not interfered with by the other magnets. In the preferred embodiment, the magnets 30 are N35 or N50 rare earth neodymium magnets with a size of eight millimeters by two millimeters.

Figure 4:
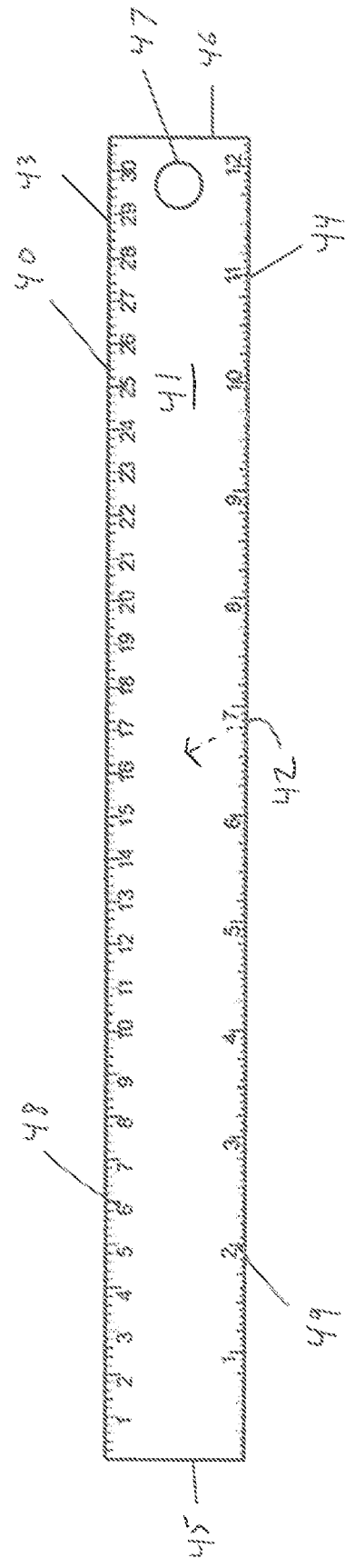
FIG. 4 is a front view of the cover.

As seen in FIG. 4, the cover 40 is a rectangular flat member having a front surface 41, back surface 42, a top edge 43, a bottom edge 44, left edge 45, and right edge 46. The top edge 43 and bottom edge 44 are parallel to each other and have the same length. The left edge 45 and right edge 46 are parallel to each other and have the same length. Adjacent to the right edge 46 is a hole 47. The hole 47 corresponds in shape to hole 20 of the tray 10. A first set of measurement markings 48 are located on the back surface 42 adjacent to the top edge 43. A second set of measurement markings 49 are located on the back surface 42 adjacent to the bottom edge 44. In the disclosed embodiment, the first set of measurement markings 48 are metric based measurements and the second set of measurement markings 49 are English based measurements. The cover 40 is constructed of transparent rigid material such as plastic. The back surface 42 is smooth.

As seen in FIGS. 1 and 5, the back surface 42 of the cover 40 is secured against the front surface 19 of the tray 10 with the top edge 43 adjacent to the top sidewall 12, the bottom edge 44 adjacent to the bottom sidewall 13, the left edge 45 adjacent to the left sidewall 14, and the right edge 46 adjacent to the right sidewall 15. The hole 47 of the cover 40 is aligned with hole 20 of the tray 10. When the cover 40 is secured to the tray 10, each magnet 30 is secured within the cavity 16. The magnet 30 may generally move or slide parallel to the bottom 18 of the cavity 16 and the back surface 42 of the cover 40. However, the magnet is generally restricted from moving perpendicularly to the bottom 18 or the back surface 42 in such a degree to flip the magnet 30. The restricted movement of the magnet 30 as described above provides greater sensitivity to the detection method as the magnet 30 only has to move along one plane of direction.

Figures 8, 9:
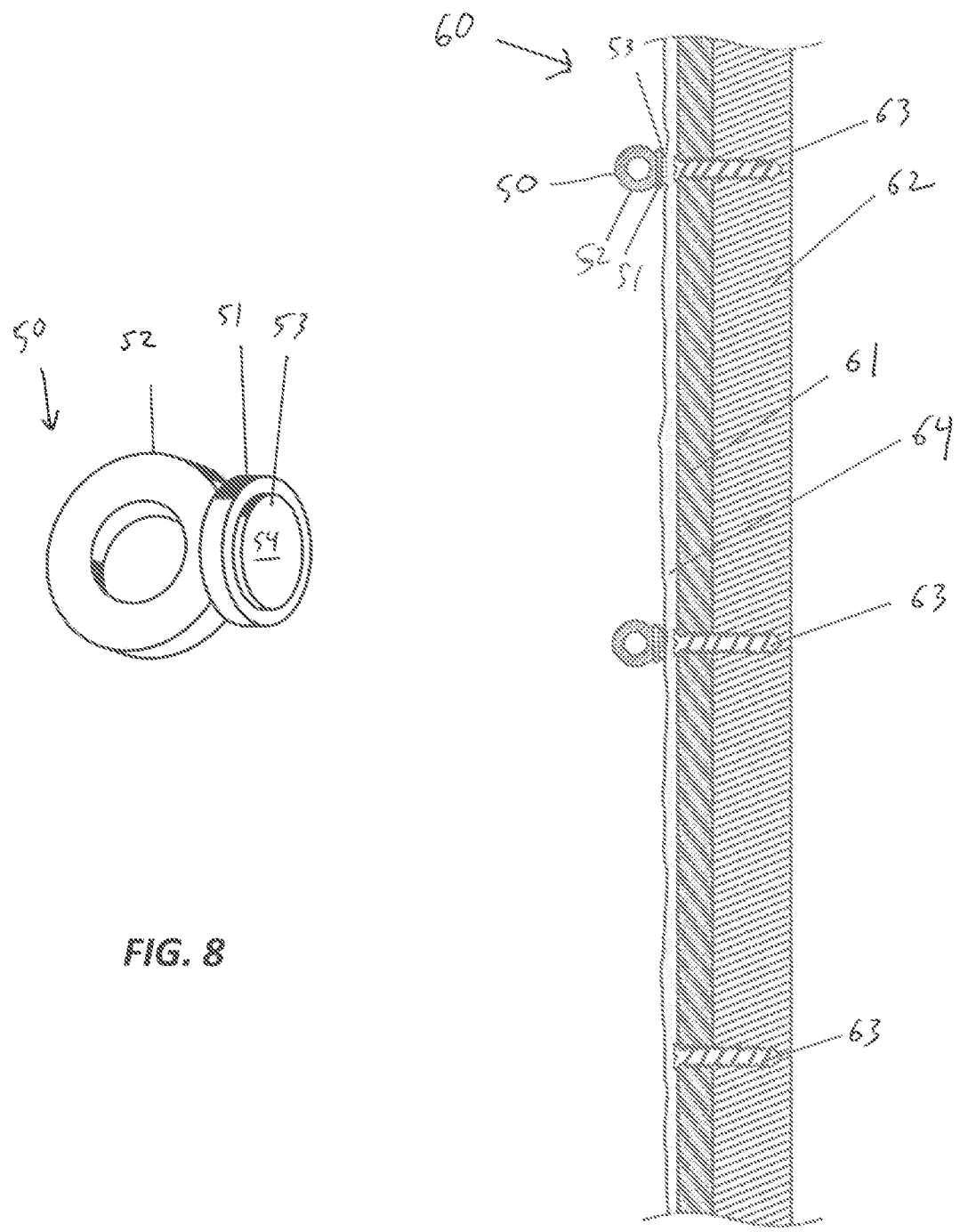
FIG. 8 is a view of a place marker as part of the system.
FIG. 9 is a cross section view of line 9-9 of FIG. 7.

As seen in FIG. 8, a place marker 50 comprises a body 51 having a handle 52 extending from it. A magnet 53 is secured within the body 51 such that the bottom surface 54 of the magnet 53 is exposed. The body 51 and handle 52 may be integrally constructed.

Figure 6:
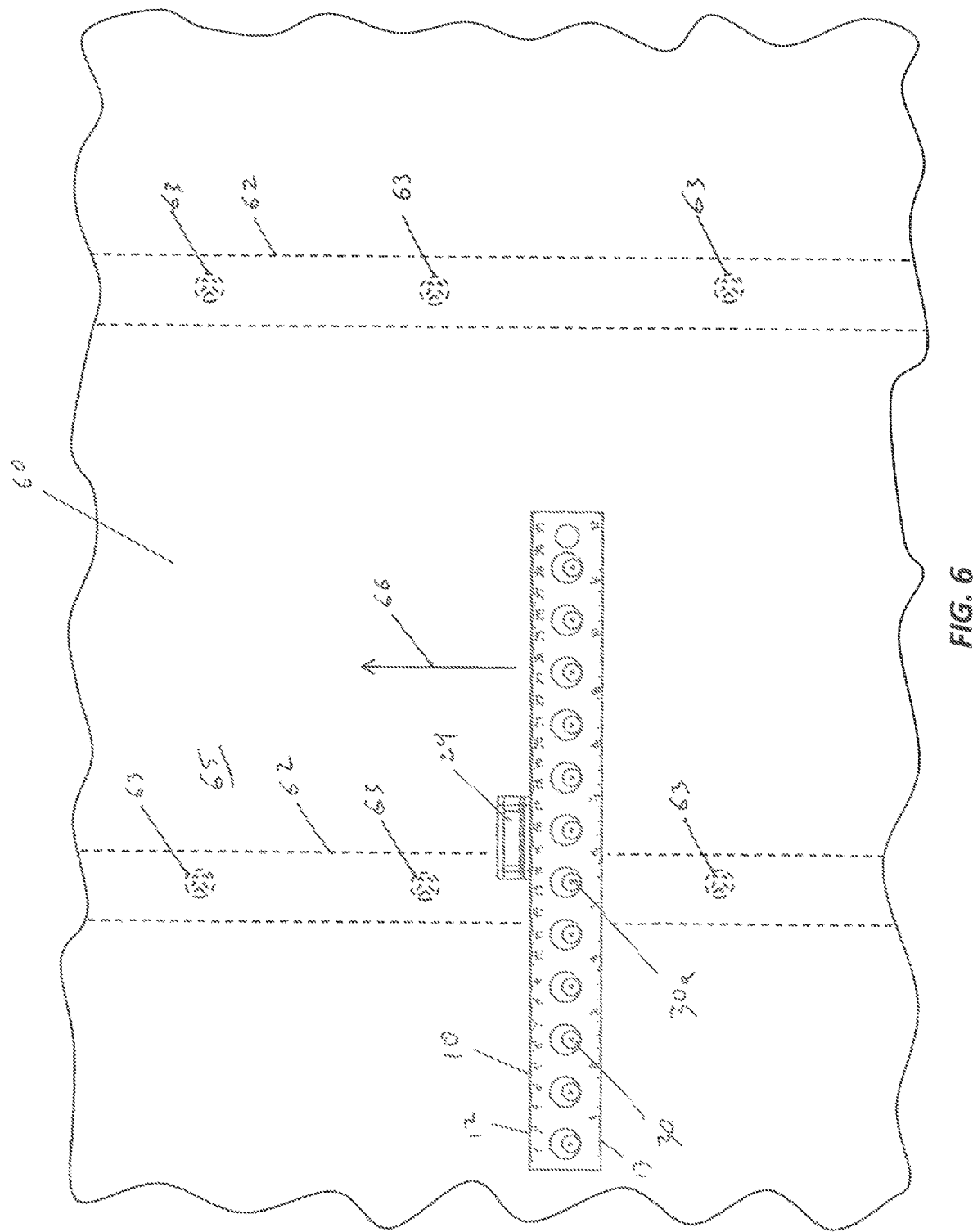
FIG. 6 is a view of an embodiment of the present invention in use against a wall.
Figure 7:
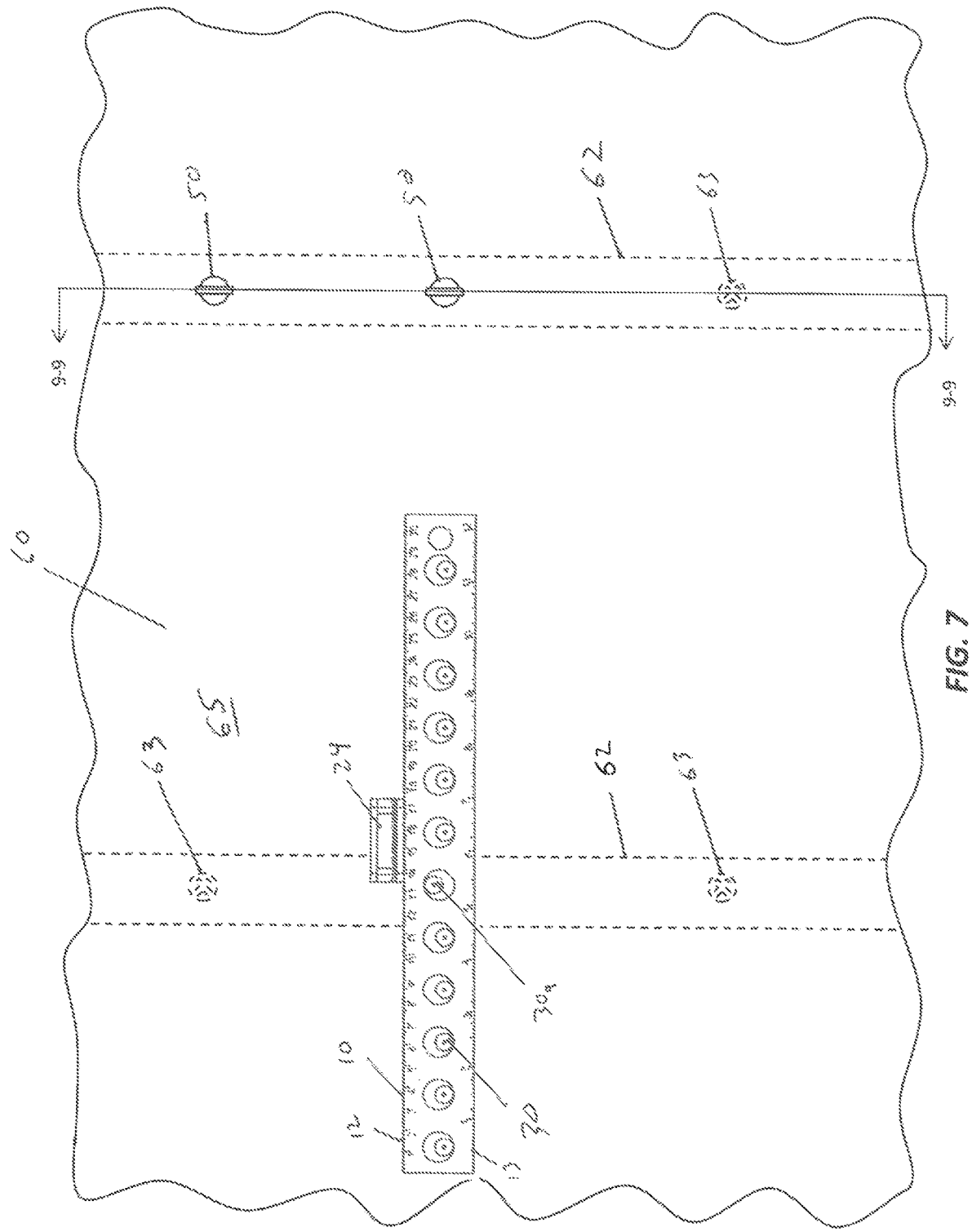
FIG. 7 is a view of an embodiment of the present invention in use against a wall.

As seen in FIGS. 6-7 and 9, a typical wall 60 is constructed by securing sheetrock 61 or other wall covering to a stud 62 using screws or nails 63. A smoothing material 64, such as mud or caulk, then covers the screws or nails 63 and any exposed joints. Paint and texture 65 is then applied which ultimately covers the sheetrock 61, screws or nails 63 and smoothing material 64 making it impossible to visually find the studs 62 or screws or nails 63. Studs 62 are usually sixteen inches apart. The amount and the spacing of screws or nails 63 along a stud 62 vary by installer and may not have a consistent pattern.

The operation of the stud finder 1 to locate studs is described in reference to FIGS. 6-7 and 9. To operate the stud finder 1, the stud finder 1 is placed flat against the wall 60 with the back surface 21 flush against the wall 60. The user may utilize the level 24 as a handle. In this position, each magnet 30, 30a rest against the sidewall 17 of the cavity 16, 16a adjacent to the bottom sidewall 13. As seen in FIG. 6, the stud finder 1 is slid across the wall 60 in an upwards direction 66 until one or more magnets 30, 30a moves within the cavity 16 away from the bottom sidewall 13. The circular shape of the cavity 16 permits the magnet 30 to move against the sidewall 17 unobstructed and in the exact direction of the magnetic force making it easier to determine which direction the ferrous material is located. As seen in FIG. 7, magnet 30a is positioned at the top of cavity 16a. At this point, the ferrous material within the wall may be directly under the magnet 30a or may be still above the magnet 30a but close enough to allow for a magnetic attraction of sufficient strength to move the magnet 30a. Continuing to move the stud finder 1 in this direction will ultimately cause the magnet 30a to remain still or be moved against the bottom wall 13 until ultimately the magnetic attraction is no longer strong enough to move the magnet.

Magnet 30a is magnetically engaged with a ferrous material within the wall 60 causing the magnet 30a to overcome the force of gravity permitting it to "stick" to the place on the wall in which the ferrous material is present. The magnet 30a maintains the magnetic attraction to the ferrous material in the wall 60 and will remain engaged until the sidewall 17 of the cavity 16 prevents further movement of the magnet. The ferrous material likely corresponds to a screw or nail 63 that secures the sheetrock 61 to a stud 62.

A place marker 50 may then be placed against the wall 60 with the bottom surface 54 of the magnet 53 flush against the wall 60 over the location of the screw or nail 63. The place marker 50 remains in place against the wall 60 due to the magnetic force between the magnet 53 and the screw or nail 63. As seen in FIGS. 7 and 9, a place marker 50 is already positioned onto the wall 60 and held in place by the magnetic force between the magnet 53 and the screw or nail 63. The place marker 50 permits marking the location of a stud 62 without writing or marking the wall 60. The place marker 50 also indicates where a screw or nail should not be inserted in the wall 60 at that location as there is already a preexisting screw or nail.

The stud finder 1 may be moved against the wall 60 laterally, vertically, or diagonally. A typical sheet rock installation has screws or nails every six to ten inches. As a result, in may be advantageous to utilize the stud finder in a vertical position if the stud finder has a length greater than 10 inches. In this orientation, the magnets 30 are positioned against the sidewall 17 proximal to the left sidewall 14 or right sidewall 15 depending on the orientation of the stud finder 1. As the stud finder moves to the left or right, the magnets remain stationary until one or more magnets 30, 30a moves within the cavity 16 away from the left sidewall 14 or right sidewall 15. Similarly to as described above, the magnetic attraction indicates the presence of a ferrous material behind the wall 60. In this orientation, a stud finder 1 that is approximately twelve inches may detect two screws or nails within the wall. The level may be used to ensure the stud finder is level to the ground and permit the drawing of a straight edge.

When not in use, the stud finder 1 may be hung up on a wall or pegboard as the hole 20, 47 provides a location for the stud finder to be hung on a hook or nail.

In the disclosed embodiment, the cover 40 is a standard ruler that is generally one foot long. The accompanying tray 10 is sized to house the cover 40 to ensure the magnets 30 are secured within the cavities 16. In alternative embodiments, the cover and accompanying tray may be sized smaller or larger. For example, it may be preferential for the tray and cover to be approximately sixteen inches long as some studs are spaced that far apart. In a further alternative shape, the tray and accompanying cover may be square shape with rows and columns of magnets secured within cavities. The number of magnets may be increased or decreased depending on the size of the stud finder.

In a further alternative embodiment, the cover may only be sized to secure the individual cavity. In such instances, the measurement markings would be located on the top surface of the tray.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. It will be understood by one of ordinary skill in the art that numerous variations will be possible to the disclosed embodiments without going outside the scope of the invention as disclosed in the claims.

I claim:

1. A stud finder comprising:
a rigid non-ferrous base having
  a first surface,
  a second surface parallel to and opposite the first surface; and
  at least two cavities each having a bottom that is parallel to the second surface, a sidewall that is perpendicular to the bottom, and an opening through the first surface;
a transparent cover having a top surface and bottom surface wherein the cover is attached to the first surface of the base with the bottom surface of the cover positioned over the opening of each cavity; and
at least one magnet having a top surface, bottom surface, and at least one sidewall positioned within each cavity and moveable within each cavity so long as the top surface of the magnet is adjacent the bottom surface of the cover and the bottom surface of the magnet is adjacent the bottom of the cavity.

2. A stud finder of claim 1 further wherein the height of the magnet is
less than the height of the sidewall and
greater or equal to half the height of the sidewall.

3. A stud finder of claim 1 further wherein the sidewall is cylindrical.

4. A stud finder of claim 1 further wherein the magnet is cylindrical.

5. A stud finder of claim 1 further wherein the second surface has beveled edges.

6. A stud finder of claim 1 further comprising a level attached to the base.

7. A stud finder system comprising:
stud finder comprising:
  a rigid non-ferrous base having
    a first surface,
    a second surface parallel to and opposite the first surface; and
    at least two cavities each having a bottom that is parallel to the second surface, a sidewall that is perpendicular to the bottom, and an opening through the first surface;
  a transparent cover having a top surface and bottom surface wherein the cover is attached to the first surface of the base with the bottom surface of the cover positioned over the opening of each cavity; and
  at least one magnet having a top surface, bottom surface, and at least one sidewall positioned within each cavity and moveable within each cavity so long as the top surface of the magnet is adjacent the bottom surface of the cover and the bottom surface of the magnet is adjacent the bottom of the cavity; and
a place marker comprising a body and magnet.

8. A stud finder system of claim 7 wherein the sidewall is cylindrical.

9. A stud finder system of claim 7 further wherein the magnet is cylindrical.

10. A stud finder system of claim 7 further wherein the second surface has beveled edges.

11. A stud finder system of claim 7 further comprising a level attached to the base.

12. A method of detecting a ferrous material in a wall comprising the steps of:
placing a stud finder flush against the wall wherein the stud finder comprises:
  a rigid non-ferrous base having
    a first surface,
    a second surface parallel to and opposite the first surface; and
    at least two cavities each having a bottom that is parallel to the second surface, a sidewall that is perpendicular to the bottom, and an opening through the first surface;
  a transparent cover having a top surface and bottom surface wherein the cover is attached to the first surface of the base with the bottom surface of the cover positioned over the opening of each cavity; and
  at least one magnet having a top surface, bottom surface, and at least one sidewall positioned within each cavity and moveable within each cavity so long as the top surface of the magnet is adjacent the bottom surface of the cover and the bottom surface of the magnet is adjacent the bottom of the cavity;
sliding the stud finder across the wall until a magnet moves within the cavity; and
placing a place marker on the wall where the magnet moved wherein the place marker comprises a body and magnet.

* * * * *